United States Patent [19]
Takigawa

[11] 3,732,797
[45] May 15, 1973

[54] DIAPHRAGM DEVICE FOR A CAMERA
[75] Inventor: Tomoshi Takigawa, Tokyo, Japan
[73] Assignee: Canon Kabushiki Kaisha, Tokyo, Japan
[22] Filed: Dec. 31, 1970
[21] Appl. No.: 103,027

[30] Foreign Application Priority Data
  Jan. 9, 1970  Japan ............................... 45/3255
  Jan. 9, 1970  Japan ............................... 45/3256

[52] U.S. Cl. ................................................. 95/64 R
[51] Int. Cl. ............................................... G03b 9/02
[58] Field of Search ................. 95/64 D, 64 R, 64 B

[56] References Cited
UNITED STATES PATENTS

| 2,976,791 | 3/1961 | Larsson | 95/86 |
| 3,550,519 | 12/1970 | Lewis | 95/86 |
| 3,071,058 | 1/1963 | Gebele | 95/64 D |
| 3,068,768 | 12/1962 | Rentschler | 95/64 D X |
| 3,173,350 | 3/1965 | Steisslinger | 95/64 D |
| 3,461,786 | 8/1969 | Sato | 95/64 D |
| 3,159,088 | 12/1964 | Bauer | 95/64 D |
| 2,213,742 | 9/1940 | Mihalyi | 95/64 D |

Primary Examiner—Samuel S. Matthews
Assistant Examiner—Monroe H. Hayes
Attorney—Toren & McGeady

[57] ABSTRACT

In the disclosed diaphragm assembly, a diaphragm control ring that moves to open and close the diaphragm blades, forms several cam grooves. Each groove is capable of receiving an indicator extension. In this way the diaphragm assembly is adapted to operate with various types of cameras having different diaphragm indicator mechanisms. Each groove engages the mechanism which extends toward that groove.

5 Claims, 3 Drawing Figures

INVENTOR.
TOMOSHI TAKIGAWA
BY Toren and McGeady
ATTORNEYS

3,732,797

DIAPHRAGM DEVICE FOR A CAMERA

BACKGROUND OF THE INVENTION

This invention relates to cameras, and particularly diaphragm devices which control the apertures of the lenses on the camera.

An object of this invention is to improve diaphragm systems and render them more versatile.

SUMMARY OF THE INVENTION

According to a feature of the invention, a single plate in a diaphragm actuating mechanism forms two or more cam grooves. The cam grooves provide an indication of the diaphragm opening by virtue of their respective positions. One of the cam grooves is selected to engage the diaphragm indicator mechanism on a camera on the basis of the particular position of the mechanism on the camera.

According to a general feature of the invention means are provided on the plate for rendering the assembly interchangeably usable with various types of cameras.

According to another feature of the invention, in a diaphragm control suitable for different types of cameras, a single plate drives a plurality of diaphragm blades by means of slots that engage pins on the blades, and a set of cam grooves is arranged so that a pointer can engage any one of the cam grooves and transmit the rotation of the plate to any number of positions. Other grooves on the plate respond to a drive member that rotates the plate.

The present invention is explained in detail with reference to the drawings of an example embodying features of the invention.

BRIEF DESCRIPTION OF THE DRAWINGS

FIG. 3 shows a state wherein a base plate has been removed.

DESCRIPTION OF PREFERRED EMBODIMENTS

Figure 1:
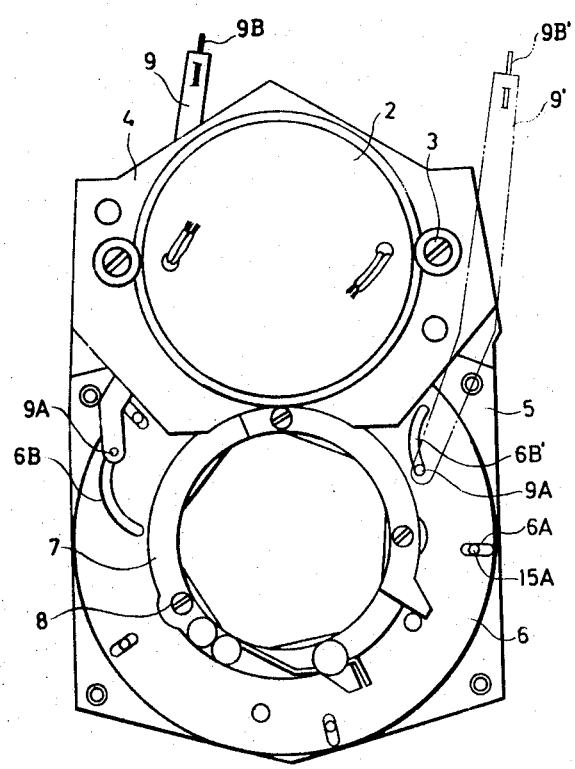
FIG. 1 is a rear elevation of the diaphragm device of a camera according to the present invention.
Figure 2:
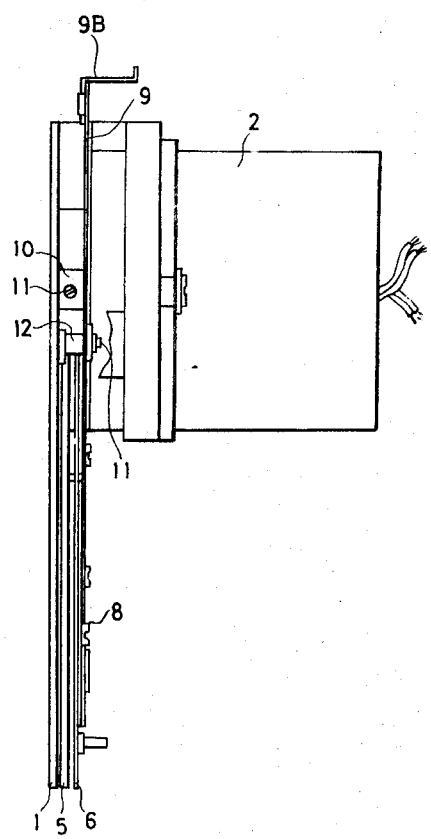
FIG. 2 is its side elevation.

In each drawing, 1 is a base plate, 2 is an electric motor which has its rotating direction changed depending on the polarity of the voltage impressed. Reference character 2A represents an axle of the rotary electric motor 2, 3 is a screw, 4 is a mounting member of the rotary electric motor 2, 5 is a support plate having a support opening at its center portion, and 6 is a cam plate.

Reference characters 6A, 6B, 6B' and 6C represent cam grooves provided in the cam plate 6. A thrust receiving member 7 is fixed to a support plate 5, and forms a support for the cam plate 6 in a thrust direction. A screw 8 fixes the thrust receiving member 7 to the support plate 5. An indication lever 9 has a pin 9A mounted at one end the indication lever 9. A pin 9A engages a cam groove 6B. An indicating pointer or needle 9B extends from the other end of the indication lever 9 so that it will appear in the view window of a finder. An indication lever 9', a pin 9A' engaging the cam groove 6B', and an indication needle, 9B' form a part of the diaphragm indication device used with a different kind of camera. Reference numeral 10 represents indicating lever axles 11 and 11' rotatably support the indication levers 9 and 9'. Cylindrical members 12 and 12' are integrally mounted on the indication levers 9 and 9' and rotate around the axles 11 and 11' with the indication lever 9, 9'. A diaphragm blade driving lever, 13 holds a pin at one end. The pin 13A is in an engaging relationship with the cam groove 6C of the cam plate 6, and 13B is a balancing weight fixedly provided at the other end of the lever 13. An opening 14 through which a photographing light passes, forms a diaphragm aperture. Five diaphragm blades 15 adjust the diaphragm aperture around the aperture 14. As the pins mounted on the diaphragm blades 15 engage with the holes provided on the support plate 5, the diaphragm blades 15 can be rotated around the centers of said holes. A pin 15A mounted on one end of a diaphragm blade 15, engages the cam groove 6A of the cam plate 6.

Since the device of the present invention has above mentioned structure, the rotation of the electric motor 2 causes rotation of the driving lever 13, which in turn drives the cam plate 6 determining a prescribed diaphragm aperture at the same time the indication device indicates the state by virtue of the rotation of the cam plate at that time. Furthermore, the diaphragm device of the present invention is such that plural number of indication devices can be selectively attached to the cam plate 6. Thus it becomes possible to use a diaphragm device which is common to various types of cameras to indicate the state of the diaphragm of such cameras. Thus the present invention helps to simplify and facilitate the manufacture, inspection and maintenance, etc., thereby providing a number of advantages industrially.

The collar 10 which is integral with the driving lever 13 is fixed to the axle 2A of the electric motor 2 by a screw 11. The pin 13A planted on the driving lever 13 engages the cam groove 60 of the cam plate 6, thus the cam plate 6 is rotated by the rotation of the electric motor. Since a pin 15A fixed on the diaphragm blade 15 engages the cam groove 6A provided on the cam plate 6, the group of the diaphragm blades controls the aperture dimension of the diaphragm through the rotation of the cam plate. The state of such control is indicated in the indicating device. The base plate 1 is fixed to the member 4 by screws, and the electric motor 2 is fixed to the member 4 by screws 3.

Figure 3:
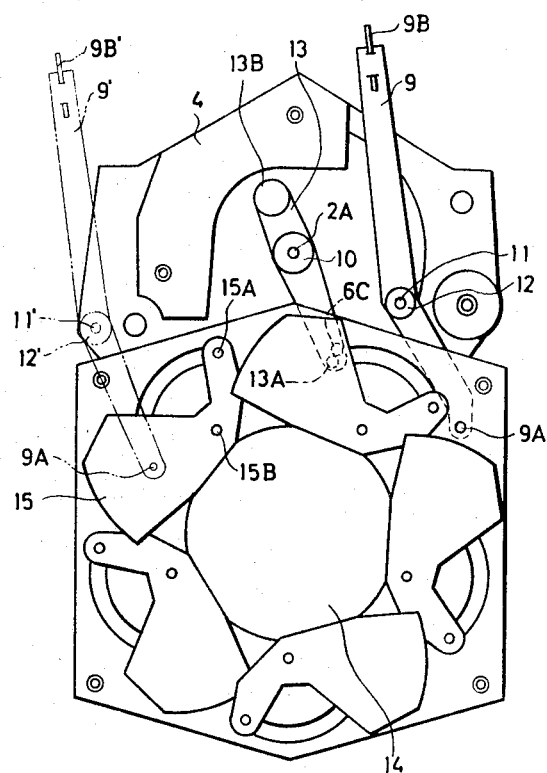
FIG. 3 is its front elevation.

The support plate 5 is fixed to the base plate 1, and diaphragm blades 15 are positioned in a gap between these two plates. The base plate in this case is not shown in FIG. 3.

The indication lever 9, 9A, 9C may be used it is in a different kind of camera as shown, at 9', 9A', 9B', 9C'.

What is claimed is:

1. A diaphragm assembly for cameras having diaphragm-opening indicating means located at a plurality of positions, comprising mounting means forming a path of light with the camera, a plurality of diaphragm blades movably mounted on said mounting means for movement into and out of the path of light, a single diaphragm control plate coupled to said blades and movable relative to said mounting means for moving the blades into and out of the path of light so as to vary the diaphragm opening, said diaphragm control plate having a plurality of slots engageable with said blades for moving said blades, said plate having a plurality of grooves at different locations on said plate, movement of said plate producing movement of the grooves so that the position of the grooves corresponds and is indicative of the position of said plate, said plate having a recess for receiving driving energy that drives the plate, coupling means for transmitting information concerning the diaphragm opening to any one of the plurality of positions, said coupling means including a transmission member engageable with respective ones of said grooves at the different locations on said plate, said grooves being shaped to receive the transmission member so that said transmission member may be interchangeably connected to any one of said grooves for transmitting information regarding the position of said plate to said indicating means, and driving means for moving said plate in order to vary the diaphragm opening and including a drive portion engaging said recess to move the plate and the blades.

2. A diaphragm assembly as in claim 1, wherein said blades each includes a pin engageable with one of said slots and mounted on the blade so that movement of said plate with said slots moves said blades.

3. A diaphragm assembly as in claim 2, wherein said driving means includes a rotatable member in engagement with the drive portion and actuable by said camera.

4. A diaphragm assembly as in claim 1, wherein said drive driving means includes a rotatable member in engagement with the drive portion and actuable by said camera.

5. A diaphragm assembly suitable for use with motion picture cameras adapted for two film arrangements and having diaphragm-opening indicating means located at different positions, comprising mounting means forming a path of light with the camera, a plurality of diaphragm blades movably mounted on said mounting means for movement into and out of the path of light, a single diaphragm control plate coupled to said blades and movable relative to said mounting means for moving the blades into and out of the path of light so as to vary the diaphragm opening, drive means for driving the plate rotatably and thereby moving the blades into and out of the path of light, and coupling means for transmitting information concerning the diaphragm opening to any one of the plurality of positions, said coupling means including a transmission member and a plurality of coupling portions forming parts of said plate at different locations on said plate, said coupling portions being shaped to receive the transmission member so that said transmission member may be interchangeably connected to any of said portions, said plate being movable so that said coupling portions move with said plate and the movement is indicative of the diaphragm opening, said coupling portions forming respective grooves, and said transmission members including a portion engageable with said grooves, said plate including a plurality of slots engageable with said blades for moving said blades, said plate including a drive slot, said drive means further including a rotatable member engaging said drive slot and engageable with the camera to be driven thereby, said plate and said blades and said mounting means forming a flat structure, and said drive means including a motor.

* * * * *